United States Patent [19]

Kato

[11] Patent Number: 4,630,493
[45] Date of Patent: Dec. 23, 1986

[54] CAM ARRANGEMENT

[75] Inventor: Heizaburou Kato, Ichikawa, Japan

[73] Assignee: Sankyo Manufacturing Company, Ltd., Tokyo, Japan

[21] Appl. No.: 589,668

[22] Filed: Mar. 13, 1984

[51] Int. Cl.⁴ ............................................. F16H 37/16
[52] U.S. Cl. ....................................... 74/22 R; 74/55; 74/567; 74/569
[58] Field of Search .................... 74/567, 569, 55, 56, 74/57, 22, 27, 426

[56] References Cited

U.S. PATENT DOCUMENTS

| | | | |
|---|---|---|---|
| 779,328 | 1/1905 | Svebilius | 74/57 |
| 1,177,428 | 3/1916 | Melin | 74/569 |
| 1,847,312 | 3/1932 | Seufert | 74/569 |
| 2,441,596 | 5/1948 | Reitter | 74/57 |

FOREIGN PATENT DOCUMENTS 59-6457  1/1984  Japan .
591065  8/1947  United Kingdom .................... 74/57

Primary Examiner—Gary L. Smith
Assistant Examiner—Rodney M. Lindsey
Attorney, Agent, or Firm—Wenderoth, Lind & Ponack

[57] ABSTRACT

A cam arrangement comprises a solid cam mounted on an input shaft for rotation and having a plurality of ribs formed on a circumferential surface thereof, the solid cam being formed to a non-circular configuration at an outer periphery of the ribs, the ribs including a linear portion and an inclined portion. A spider is mounted at an end of an output shaft which extends perpendicularly to the input shaft and is disposed for both rotation and reciprocation a plurality of cam followers are mounted on the spider and each is guided between adjacent pairs of the ribs. The spider is pressed resiliently against outer surfaces of the ribs.

3 Claims, 6 Drawing Figures

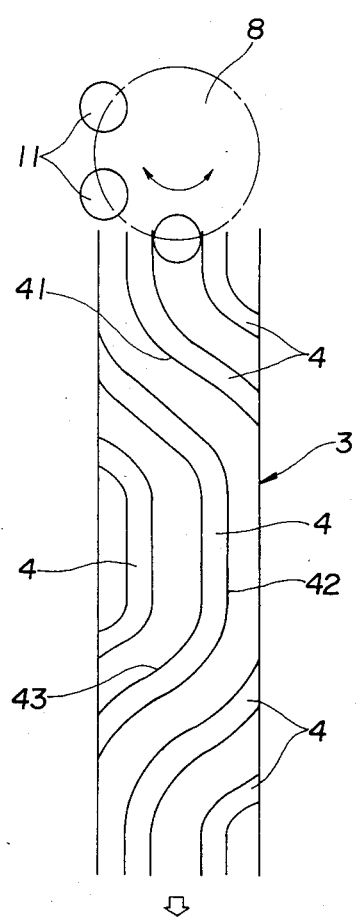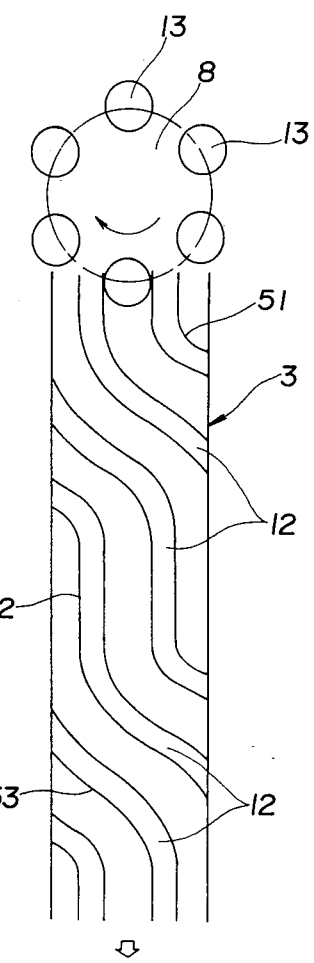

4,630,493

CAM ARRANGEMENT

BACKGROUND OF THE INVENTION

This invention relates to a cam arrangement for converting continuous rotational motions of an input shaft into either rocking motions or intermittent motions accompanied by vertical up and down motions of an output shaft, and more particularly to a cam arrangement which is applicable to what is known as "a pick and place" unit wherein a work placed at a predetermined position is chucked by a chucking device and is moved by a rocking or intermittent motion of the unit to a working station on various machines such as an automatic assembling machine, an automatic working machine, or the like.

Most conventional cam arrangements which are applied to pick and place units include a cam for providing a chuck mounted on the output shaft with vertical motions and another separate cam for providing either rocking or intermittent motions for the chuck. Such a dual cam structure requires a large space and is complicated due to a great number of parts involved. Another known cam arrangement includes a single cam employed to convert the rotational motions of the input shaft into both the vertical motions and the rocking or intermittent motions of the output shaft. In this cam arrangement, however, the conversion into the vertical motions is made through an arm member or the like, thus also causing an increase of the parts and volume of the device. Further, the conventional cam arrangements have difficulties in improving the working speed of the chuck by overlapping the vertical motions and the rocking or intermittent motions.

SUMMARY OF THE INVENTION

Accordingly, an object of the present invention is to provide a cam arrangement which can convert continuous rotational motions of an input shaft into combinations of vertical motions and rocking or intermittent motions of an output shaft by means of a single cam and which is compact in size with a simplified structure.

Another object of the present invention is the provision of a cam arrangement which makes it possible to increase the working speed of an output member mounted on an output shaft.

A cam arrangement according to the present invention comprises a housing, an input shaft supported for rotation on the housing, a solid cam having a central portion fixed to the input shaft and having a plurality of ribs formed on a circumferential surface thereof, the solid cam being formed to a non-circular configuration at an outer periphery of the ribs, the ribs including a linear portion extending in a circumferential direction and an inclined portion inclined in a lateral direction with respect to the circumferential direction, an output shaft extending in perpendicular or orthogonal relationship to the input shaft and disposed for rotational movement and also for up and down movement, a spider mounted at an end of the output shaft, a plurality of cam followers mounted on the spider and each adapted to be guided between adjacent pairs of the ribs of the solid cam, and means for resiliently pressing the spider against outer surfaces of the ribs of the solid cam.

The ribs of the solid cam may have a continuous pattern comprising the linear portion and the inclined portion which includes a first inclined portion and a second inclined portion, the second inclined portion being inclined in a direction transverse to that of the first inclined portion. The linear portion connects the first and second inclined portions, thereby converting a continuous rotation of the input shaft into a vertical motion and a rocking or oscillating rotational motion of the output shaft.

Alternatively, the ribs of the solid cam may have a continuous pattern comprising the linear portion and the inclined portion which includes a first inclined portion and a second inclined portion, the second inclined portion being inclined in the same direction as that of the first inclined portion. The linear portion connects the first and second inclined portions, thereby converting a continuous rotation of the input shaft into a vertical motion and an intermittent rotational motion of the output shaft.

Other objects, features and advantages of the present invention will become apparent from the following detailed description of preferred embodiments thereof with reference to the accompanying drawings, in which:

BRIEF DESCRIPTION OF THE DRAWINGS

FIG. 3 is an illustration of ribs of a solid cam of the cam arrangement of the first embodiment in a developed form illustrating the relation ships of such ribs to a spider and cam followers of the cam arrangement;

FIG. 5 is an illustration of ribs of a solid cam of a cam arrangement according to a second embodiment of the invention in a developed form illustrating the relation ships of such ribs to a spider and cam followers of the cam arrangement.

DETAILED DESCRIPTION OF THE PREFERRED EMBODIMENTS

Figure 1:
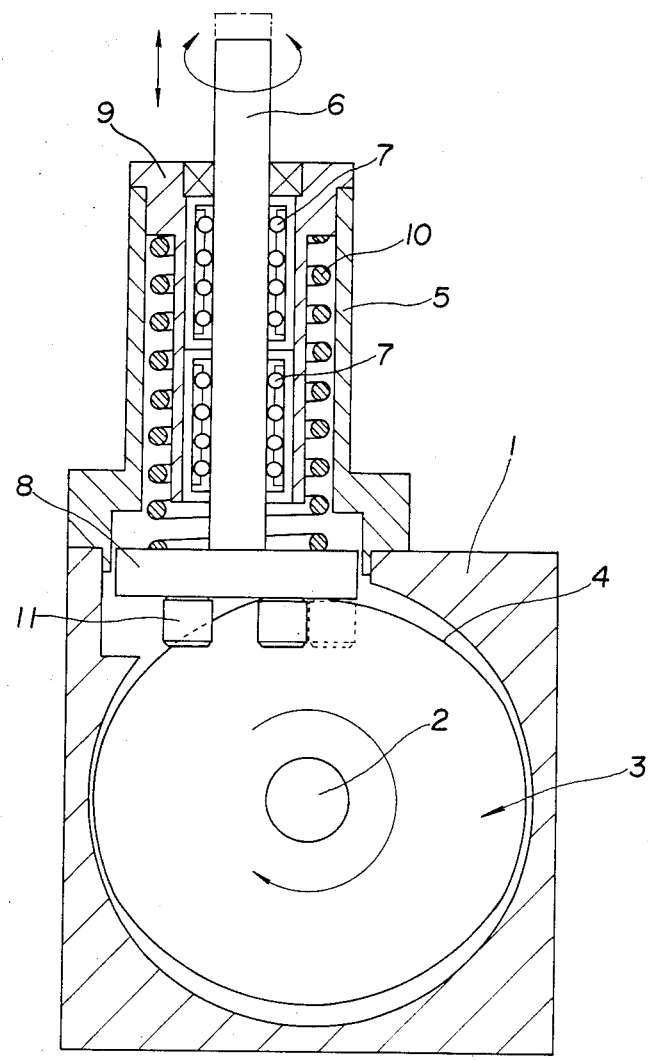
FIG. 1 is a side elevational view, partly in section, of a cam arrangement according to a first embodiment of the present invention.
Figure 2:
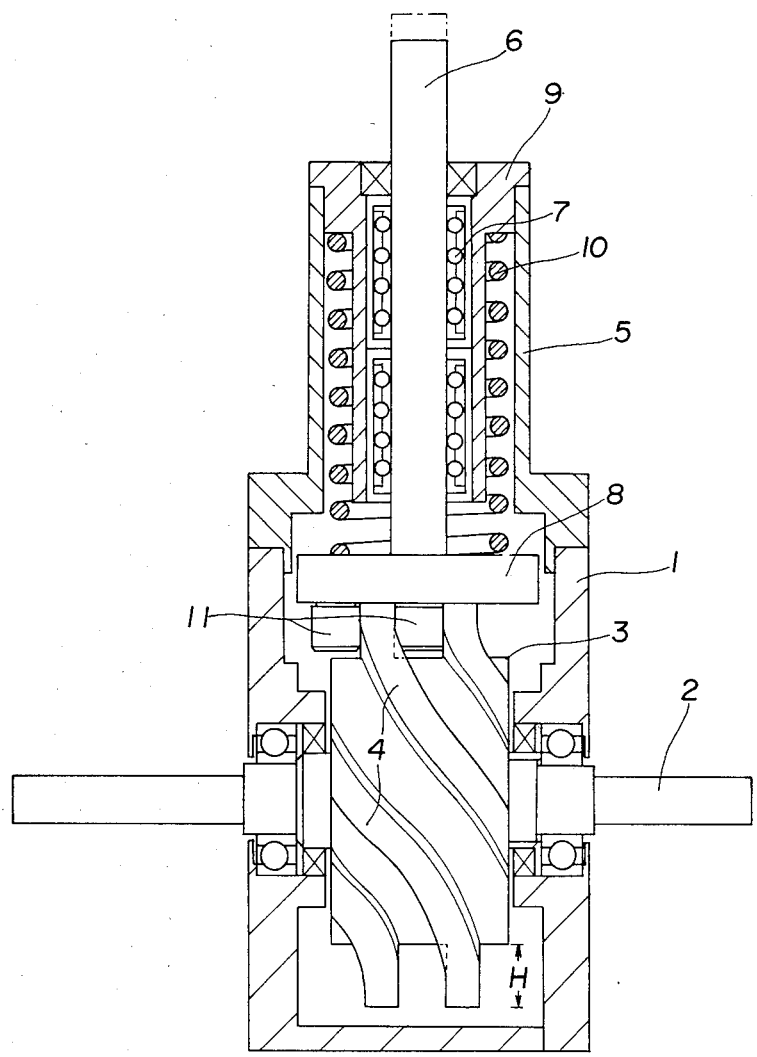
FIG. 2 is a front elevational view, partly in section, of the cam arrangement of the first embodiment.

Referring first to FIGS. 1 and 2, a housing 1 of a rectangular configuration has an input shaft 2 supported for rotation thereon. A solid cam 3 is accommodated in the housing 1 and has a central portion thereof fixedly mounted on the input shaft 2 so that the solid cam 3 may be rotated by rotation of the input shaft 2. The solid cam 3 has a plurality of ribs 4 formed on a circumferential surface thereof as shown in FIG. 2, and these ribs 4 render the configuration of the cam 3 non-circular, as seen in FIG. 1, due to a height H thereof which is nonuniform along a circumferential direction of the cam 3. A developed plan view of the ribs 4 presents a successive pattern including a first inclined portion 41 which is gradually inclined from a circumferential direction to a lateral direction, a linear portion 42 extending in a circumferential direction, and a second inclined portion 43 which is inclined in a direction transverse to the first inclined portion 41, as shown in FIG. 3.

The housing 1 is opened at the top end thereof and a tubular sleeve 5 is fixedly mounted thereat. An output shaft 6 having a chuck (not shown) mounted at the top end thereof is supported for rotation in the tubular sleeve 5 by means of bearings 7. The output shaft 6 has a spider 8 in the form of a disk integrally mounted at the bottom end thereof. A compression spring 10 is interposed between the upper face of the spider 8 and a tubular cap member 9 fitted in the sleeve 5 and thus resiliently urges the spider 8 downwardly. Three cam followers 11 are disposed in equally spaced relationship within a range of an angle of 120 degrees on the lower face of the spider 8 and are mounted for rotation around respective axes thereof such that each of them is closely received in and rolled along a groove defined by adjacent ribs 4. Accordingly, when the solid cam 3 is rotated, the cam followers 11 roll along and follow the ribs 4 thereby to oscillate the output shaft 6 through an angle of 120 degrees. In addition, since the lower face of the spider 8 is held in resilient contact with the peripheral faces of the ribs 4 of the solid cam 3, the rotation of the solid cam 4 will reciprocally move up and down the spider 8 in accordance with the cam configuration as defined by peripheral faces of the ribs 4 of the solid cam 3.

Figure 4:
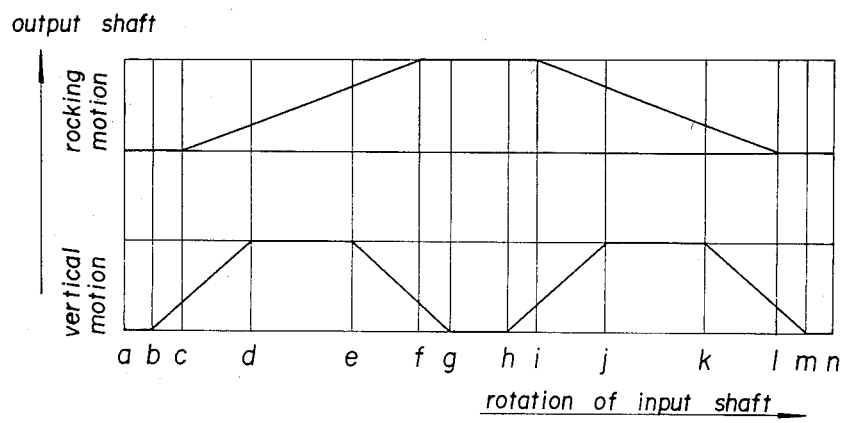
FIG. 4 is an illustration showing operations of the cam arrangement of the first embodiment.

Thus, in the cam arrangement according to the first embodiment of the present invention, the output shaft 6 is caused to effect an up and down motion and a rocking an oscillating or rotation by means of the solid cam 3 which is rotated by a continuous rotation of the input shaft 2, and the relation ships between the up and down motion and the rocking rotational motion are illustrated in detail in FIG. 4. Referring now to FIG. 4, it can be seen that a rocking rotation of the output shaft 6 is held stopped within sections a-c, f-i and l-n in which the cam followers 11 are in the respective linear portions 42 of the ribs 4. In the remaining sections c-f and i-l, the ribs 4 are rather inclined in lateral directions so that the output shaft 6 will be rotated, for example, in a counter-clockwise direction in the section c-f and in a clockwise direction in the section i-l. As regards vertical motions of the output shaft 6 caused by the non-circular configuration of the cam 3, sections a-b, d-e, g-h, j-k and m-n are sections in which the vertical position of output shaft 6 is maintained, and sections b-d and h-j are sections in which the output shaft 6 is moved upwardly while the remaining sections e-g and k-m are sections in which the output shaft 6 is moved downwardly. Thus, in the sections c-d, e-f, i-j and k-1, the vertical up and down motions and the rocking rotations of the output shaft 6 overlap with each other and hence the output shaft 6 moves up or down while rotating. Accordingly, high speed pick and place operations can be achieved with the cam arrangement in comparison with operations with conventional cam arrangements where the vertical motions and the rotational movements appear by turns, i.e. occur separately.

Figure 6:
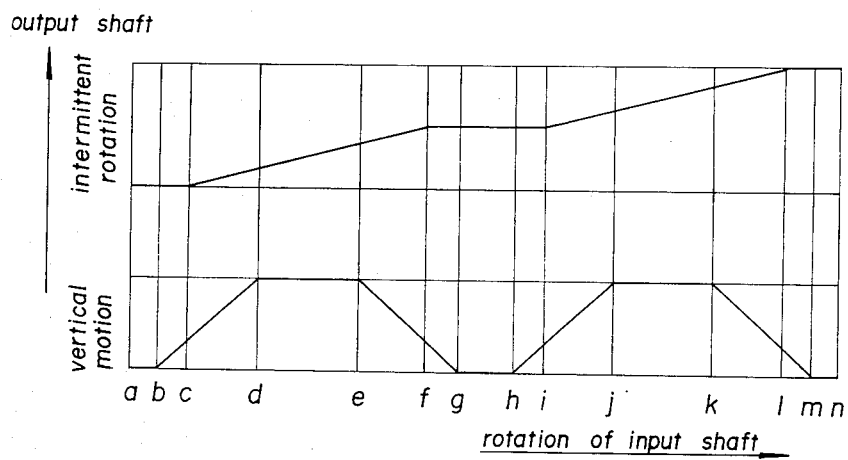
FIG. 6 is an illustration showing operations of the cam arrangement of the second embodiment.

While the present invention has been described with reference to the first embodiment in which the output shaft 6 effects up and down motions and rocking rotations, it is not limited to this arrangement and can be applied also to a cam arrangement for moving an output shaft up and down and simultaneously for rotating the output shaft intermittently in the same direction, i.e. only one direction. FIGS. 5 and 6 illustrate a second embodiment of the invention for moving an output shaft up and down and simultaneously for rotating the output shaft intermittently in a single direction.

The cam arrangement of the second embodiment of the invention has substantially the same structure as that of the cam arrangement of the first embodiment, except for differences in the configuration of ribs 12 of the solid cam 3 and also in the number of cam followers 13 mounted on the spider 8. Hence, only such differences will be described below. As shown in FIG. 5, the ribs 12 of the solid cam 3 have a continuous pattern including a first inclined portion 51 which is gradually inclined from a circumferential direction to a lateral direction, a linear portion 52 extending in a circumferential direction, and a second inclined portion 53 which is inclined in the same direction as that of the first inclined portion 51. Meanwhile, the cam followers 13 are disposed in equally spaced relationship around the entire circumference of the lower face of the spider 8 and are mounted for rotation around their respective axes. In the present embodiment, the spider 8 has up to six such cam followers 13 mounted thereon. The output shaft 6 rotates when the cam followers 13 are in the inclined portions 51 and 53 and stops rotation when cam followers are in the linear portions 52.

Intermittent rotational motions accompanied by up and down motions of the output shaft 6 are illustrated in FIG. 6. As can be seen from FIG. 6, the rotational motions and the up and down motions of the output shaft 6 overlap with each other in sections c-d, e-f, i-j and k-l so that the output shaft 6 moves up or down while rotating in a single direction. Accordingly, pick and place operations can be efficiently achieved as in the case of the first embodiment.

As is apparent from the foregoing description, the cam arrangement of the present invention makes it possible to convert the continuous rotational motion of the input shaft into the vertical motion and rocking or intermittent motion of the output member by a single cam without using an arm member or the like which requires a large space and additional parts. Therefore, the cam arrangement of the invention may be compact in size and simple in structure. Further, since the overlap of the vertical motions and the rotational motions may be obtained in the present cam arrangement, efficiency of the pick and place operation is remarkably improved.

Although the present invention has been described with reference to the preferred embodiments thereof, many modifications and alterations may be made within the spirit of the present invention.

What is claimed is:

1. A cam arrangement comprising:
   a housing;
   an input shaft rotatably mounted on said housing;
   a solid cam having a central portion fixed to said input shaft and having a plurality of ribs formed on a circumferential surface thereof and spaced from each other, said solid cam being formed to a non-circular configuration at an outer periphery of said ribs, said ribs including a linear portion extending in a circumferential direction and an inclined portion inclined in a lateral direction with respect to said circumferential direction;
   an output shaft extending in perpendicular relationship to said input shaft and mounted for rotational movement and also for movement in opposite axial directions;
   a spider fixed to an end of said output shaft and maintained in contact with said outer periphery of said ribs of said solid cam;
   a plurality of cam followers mounted on said spider, each said cam follower being guided between an adjacent pair of said ribs; and
   means for resiliently pressing said spider into continuous contact with said outer periphery of said ribs.

2. A cam arrangement as claimed in claim 1, wherein said ribs of said solid cam have a continuous pattern comprising said linear portion and said inclined portion, said inclined portion including a first inclined portion and a second inclined portion, said second inclined portion being inclined in a direction transverse to that of said first inclined portion, and said linear portion connecting said first and second inclined portions, thereby converting continuous rotation of said input shaft into axial motion and oscillating rotational motion of said output shaft.

3. A cam arrangement as claimed in claim 1, wherein said ribs of said solid cam have a continuous pattern comprising said linear portion and said inclined portion, said inclined portion comprising a first inclined portion and a second inclined portion, said second inclined portion being inclined in the same direction as that of the first inclined portion, and said linear portion connecting said first and second inclined portions, thereby converting continuous rotation of said input shaft into axial motion and intermittent rotational motion of said output shaft.

* * * * *